United States Patent [19]

Prochaska et al.

[11] Patent Number: 4,525,005
[45] Date of Patent: Jun. 25, 1985

[54] BUMPER COMPONENT MADE OF FIBER-REINFORCED MATERIAL FOR AUTOMOBILES OR THE LIKE

[75] Inventors: Wolfgang Prochaska, Munich; Ralf-Thilo Schulz, Putzbrunn, both of Fed. Rep. of Germany

[73] Assignee: Messerschmitt-Boelkow-Blohm Gesellschaft mit beschraenkter Haftung, Munich, Fed. Rep. of Germany

[21] Appl. No.: 536,170

[22] Filed: Sep. 26, 1983

[30] Foreign Application Priority Data

Oct. 12, 1982 [DE] Fed. Rep. of Germany ....... 3237762

[51] Int. Cl.³ .............................................. B60R 19/08
[52] U.S. Cl. .................................... 293/117; 293/122; 293/133
[58] Field of Search ............... 293/120, 122, 121, 132, 293/133, 117

[56] References Cited

U.S. PATENT DOCUMENTS 4,076,296 2/1978 Ditto et al. ........................... 293/122
4,266,817 5/1981 Mason et al. ........................ 293/117

FOREIGN PATENT DOCUMENTS 2261447 7/1973 Fed. Rep. of Germany .
2650096 5/1978 Fed. Rep. of Germany .
2746235 7/1978 Fed. Rep. of Germany .
2754867 6/1979 Fed. Rep. of Germany .

Primary Examiner—Robert R. Song
Attorney, Agent, or Firm—W. G. Fasse; D. H. Kane, Jr.

[57] ABSTRACT

A vehicle bumper bar is made of at least one completely closed box shaped body wound of fiber-reinforced synthetic resin impregnated strands or bands with a fiber orientation that may vary along the length of the bar and also from one wall of the box shape to the other. Several bodies of closed cross-section may be bonded together, for example by the resin curing, to form a single integral body of approximately square configuration. Towing elements may be integrated directly into the bar.

11 Claims, 6 Drawing Figures

BUMPER COMPONENT MADE OF FIBER-REINFORCED MATERIAL FOR AUTOMOBILES OR THE LIKE

BACKGROUND OF THE INVENTION

The invention relates to a bumper component made of fiber-reinforced material for automobiles or the like. Such component is secured to a vehicle chassis and supports or carries the impact absorbing component.

Today, bumper components or support members for bumpers of automobiles are being made more and more of fiber-reinforced material. Fiber-reinforced materials, for example a composite of glass fibers and resin, have a light weight and simultaneously a high mechanical strength or load capacity. Such bumpers replace conventional bumpers made of metal, as described, for instance in German Patent Publication (DE-OS) No. 2,746,235. Bumpers made of metal have a low bending strength and a low flexural stiffness, Besides, they are heavy.

German Patent Publication (DE-OS) No. 2,754,867 may be taken as an example of bumper support members made of fiber-reinforced material. This known bumper has an approximately U-shaped cross-section and is constructed of resin impregnated fiberglass mats with an unoriented glass fiber component and a component of endless or rather, cut and thereby oriented, glass fibers. The production of such bumper support members can be automated, whereby the resin soaked or impregnated fiberglass mats are inserted into a tool, by means of which the fiberglass mats are then placed onto an appropriately shaped mold whereupon they are molded by compression.

According to German Patent Publication (DE-OS) No. 2,650,096 a similarly U-shaped profiled bumper support member made of fiber-reinforced material may be reinforced in the area of the horizontal walls. A securing element, e.g., for a trailer coupling or a towing eye may then be secured in the area of this reinforcement. This type of structure uses the tensile strength of fiber-reinforced materials so that no further securing points, e.g. a trailer coupling or a towing eye or lug must be provided on the frame components of the automobile or the like.

The production of such bumper support members made of U-profiles or sections of fiber-reinforced material, even with considerable automation, is still complicated. Thus, complex tools must be available for cutting the impregnated fiber mats to size and for then inserting the cut shapes into the actual pressing tool. These operations are, however, still often performed by hand.

It is further known from German Patent Publication (DE-OS) No. 2,261,447 to use a winding technique for producing bumpers made of fiber-reinforced material. In this known method pre-stressed glass fibers coated with a hardening synthetic material are wound around a removable box-shaped core, so that the winding portions extending in horizontal planes and in parallel to each other determine the height of the bumper. After the completion of the winding operation, the thus produced wound body is separated into two parts by a cut along its lengthwise axis, so that two bumper support members with respective U-profiles or sections result. Difficulties arise, however, along the lengthwise edges of the cut-open profile, at which the bumpers must be attached to a vehicle chassis. The bumper can fray along these edges and under such conditions additional sheathing must be provided for the attachment or securing.

OBJECTS OF THE INVENTION

In view of the above it is the aim of the invention to achieve the following objects singly or in combination:

to simplify the production of bumper support members made of fiber-reinforced material, more specifically to provide a bumper support member which optimally utilizes the strength characteristics of fiber-reinforced synthetic materials;

to construct a bumper of fiber-reinforced materials having strength characteristics which are determined and which may be optimally utilized within a wide range or wide limits;

to provide the bumper of fiber-reinforced material which has improved possibilities, as compared to conventional bumpers having a U- or C-cross-section for connection to the frame or chassis components of a vehicle;

to construct such a bumper so that it has a high dimensional or shape stability;

to utilize a fully automated winding operation in the production of such bumpers;

to integrate towing means into the wound bumper structure;

to substantially avoid fraying of the fiber windings under normal operating conditions; and to vary the winding or lay angle of the reinforcing fibers in accordance with any particular requirements such as the integration of towing means directly into the bumper.

SUMMARY OF THE INVENTION

The bumper of the invention comprises a wound body of fiber-reinforced material. This wound body has a completely closed, approximately box shaped cross-section. Thus, the present bumper is not made of resin-impregnated fiber mats pressed into shape, but is wound of resin-impregnated fiber strands or fiber bands. The box-shaped profile or cross-section offers better connection possibilities to carrying frame components than conventional U-profiles. Additionally, such box shape offers a very high inherent shape stability and hence resistance against deformation. The winding method or operation can be fully automated, manual operations are no longer necessary. Through a controlled depositing of the fiber strands or fiber bands, the strength characteristics of the bumper support member may be optimally determined. For example, the so produced box-shaped wound body may comprise a winding which absorbs impact and tension forces in approximately the horizontal direction on the horizontal box walls. At least the vertical wall facing away from the vehicle may have a winding direction with small winding or lay angles relative to the horizontal, lengthwise direction of the bumper support member. Such a winding direction makes it possible to connect to or integrate with the horizontal box wall arrangements for securing for example a trailer coupling, a towing lug or eye or a shock absorber. By these means an integrated unit results comprising the bumper support member proper and the respective securing arrangement.

According to the invention a single bumper support member is wound in one continuous operation. The resulting box bumper is not cut into two bumpers, but it may be further machined without any problems, if desired.

A securing element or towing means for a trailer coupling or a towing lug or eye may be connected without difficulties to a bumper support member according to the invention. In a preferred embodiment the bumper support member according to the invention is assembled of two box-shaped wound bodies which are adhesively bonded to each other by the curing of the synthetic resin. A securing plate for a trailer coupling or for a cable eye is directly integrated and bonded by said curing into the bumper.

BRIEF FIGURE DESCRIPTION

In order that the invention may be clearly understood, it will now be described, by way of example, with reference to the accompanying drawings, wherein.

Figure 6:
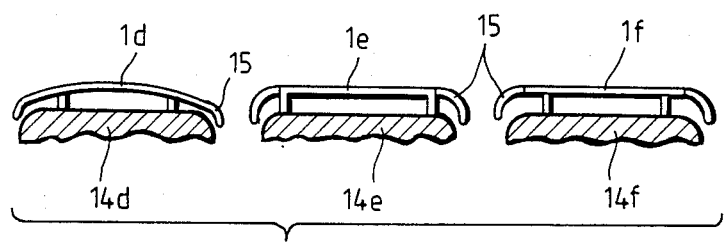

FIG. 6. shows schematic top views partially in section onto bumper support members of various shapes to illustrate some construction possibilities made available by the invention.

DETAILED DESCRIPTION OF PREFERRED EXAMPLE EMBODIMENTS AND OF THE BEST MODE OF THE INVENTION

Figure 1:
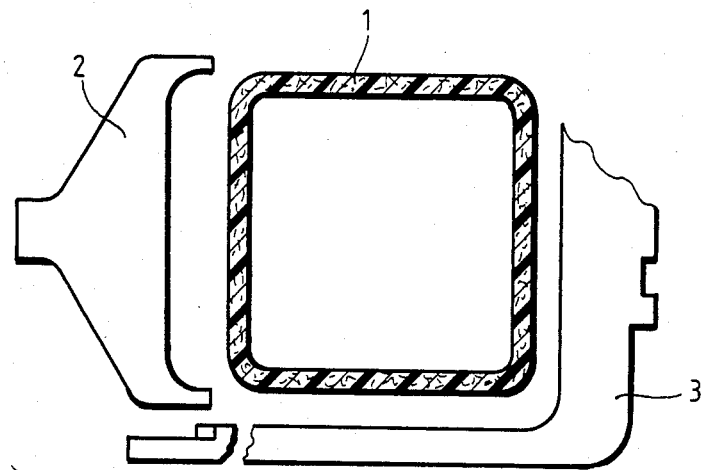
FIG. 1 is an exploded view of a first example embodiment of a bumper structure for a motor vehicle, with the bumper support member according to the invention shown in section.

The bumper structure shown in FIG. 1 comprises a bumper support bar or member 1 made of fiber-reinforced material and having an approximately square shaped cross-section. The bumper support member 1 is a wound body and was produced by a known winding method so that the bumper absorbs the tension and compression forces arising in operation. The box shaped bumper support member 1 is secured to a fork 2, which is connected to carrying frame components of a vehicle not shown. The bumper support member 1 is covered in a conventional manner by casing 3 having an approximately U-shaped cross-section, for example made of polyurethane. The casing 3 is only partially shown. This casing 3 has an energy absorbing profile or cross-section in order to absorb at least part of the impact energy in an impact accident, while the remaining energy is absorbed through the bumper support member 1 and conducted into the frame or chassis of a vehicle.

The bumper support member 1 may be wound either of thin fibers, e.g. glass fibers, which are soaked or impregnated with resin; or it is also possible to select narrow fiber strands of fiber web bands up to approximately 2 cm width for the winding operation. The horizontal box walls of the bumper support member, that is those walls which are parallel to the direction of travel of a vehicle to which the bumper is secured, comprise for example windings with winding or lay angles of ±45° relative to the longitudinal axis of the bumper and at least one winding in which the fibers extend in the direction of travel. The vertical box walls comprise windings with a winding or lay angle as small as possible. The course of the windings and thus the lay angle is dependent upon the strength requirements to be met by the bumper support member 1 with regard to tension and compression forces.

Figure 2:
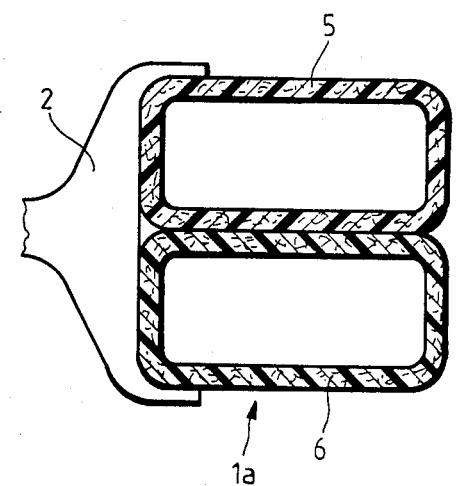
FIG. 2 is a cross-section through a further example embodiment of a bumper support member according to the invention.

FIG. 2 shows a further bumper support member 1a, which is also made of wound fiber-reinforced materials. The bumper support member 1a comprises two wound bodies 5 and 6 each having a rectangular cross-section. These wound bodies are interconnected with each other along their longer rectangle sides so that overall again a bumper support member 1a with an approximately square cross-section results. The two bodies are bonded to each other as a result of the curing of the resin impregnating the fibers.

Figure 3:
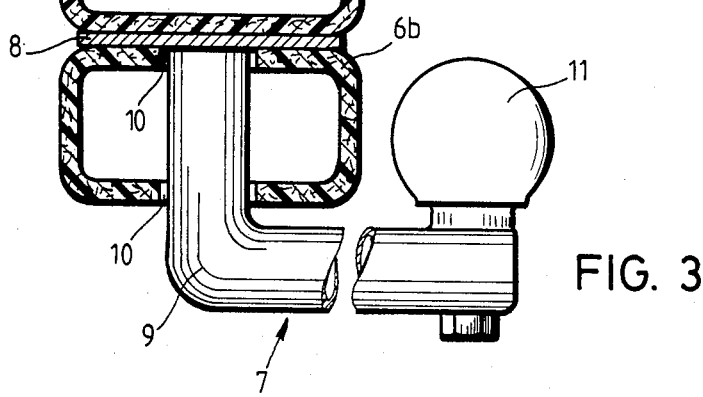
FIG. 3 is a third example embodiment of a bumper support member according to the invention with an integrated trailer coupling or hitch.

FIG. 3 shows a further bumper support member 1b again made of two rectangular wound bodies, to which a trailer coupling 7 is structurally connected. The trailer coupling 7 comprises a securing plate 8, for example made of steel, which is placed between the long rectangle sides of both wound bodies 5b and 6b and securely attached thereto, for example by an adhesive bond. An L-shaped pipe 9 is welded to the securing plate 8. The pipe 9 reaches through two openings 10 of the lower wound body 6b, and carries a coupling ball 11 on the end of its horizontal shank.

The trailer coupling shown here could for instance also be secured to the bumper support member 1 in FIG. 1. The securing plate 8 would then either be secured to the upper horizontal box wall or to the lower horizontal box wall by an adhesive bond. In the latter case, an L-shaped pipe 8 would not be necessary since the coupling ball 11 could be directly connected to a projection of the securing plate, see for instance FIG. 4.

Figure 4:
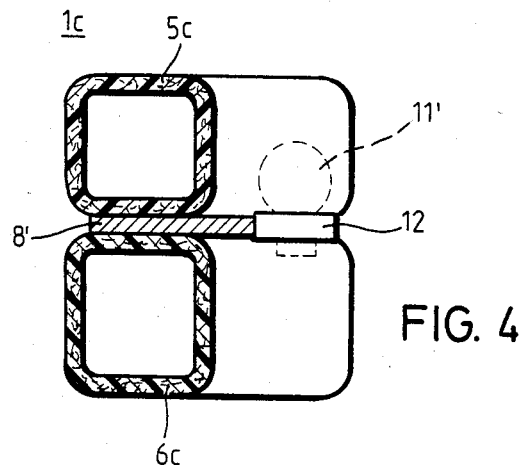
FIG. 4 is a cross-section through a further bumper support member according to the invention with an integrated tow lug or eye.
Figure 5:
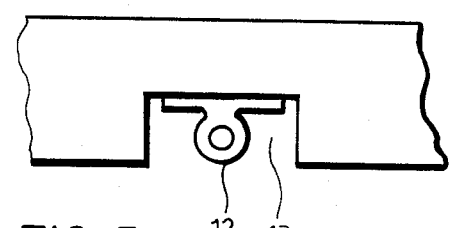
FIG. 5 is a partial top view onto the bumper support member of FIG. 4.

FIGS. 4 and 5 show a bumper support member 1c with an integrated towing lug or eye 12. The bumper support member 1c is assembled of two wound bodies 5c and 6c having rectangular profiles or cross-sections as shown in FIG. 3. In the area where the towing lug 12 is secured to the bumper support member, both wound bodies 5c and 6c are constricted so that the bumper support member here comprises a recess 13. The towing lug or eye 12 is located within this recess 13 and does not reach out beyond the outer contour of the bumper support member 1c. This feature prevents damage to an impacting vehicle by the towing lug in a rear end collision.

The towing lug or eye 12 itself is secured to a securing plate 8' which is placed between the two wound bodies 5c and 6c and attached thereto for example by an adhesive bond. The securing plate 8' and the towing lug 12 are both, e.g., made of steel, but may instead be made of fiber-reinforced material in this case. As shown by dashed lines in FIG. 4, it is, for example, possible to provide the securing plate 8' with a coupling ball 11' in the area of the towing lug 12, so that an integrated trailer coupling results.

FIG. 6 shows three schematic top views onto various bumper support members 1d, 1e, 1f, which are attached to an automobile 14d, 14e, and 14f. The shock absorbing casings of, e.g., polyurethane are omitted in FIG. 6. From these examples it is clear that not only straight bumper support members may be wound as for instance the support member 1e or 1f, but also slightly bent bumper support members, as the support member 1d, may be wound. At the ends of the bumper support member, insert pieces 15 having the desired outer contour of the respective bumper support member may be attached thereto by conventional means. The insert pieces 15 illustrate different curvatures.

Bumper bars made of fiber-reinforced material with box profile are inherently strong and can be heavily loaded, without causing distortion. In driving impact accidents, they also exhibit good elastic spring and damping characteristics under high loads, without becoming plastically or permanently deformed.

Although the invention has been described with reference to specific example embodiments, it will be appreciated that it is intended to cover all modifications and equivalents within the scope of the appended claims.

Incidentally, the lay angles of the windings on the vertical box walls are preferably within the range of 0° to 10°.

What is claimed is:

1. A fiber-reinforced vehicle bumper bar having a central longitudinal axis, comprising at least two wound bodies of fiber-reinforced synthetic resin impregnated material windings, each of said wound bodies having a box-shaped completely closed substantially rectangular cross-sectional configuration, said fiber-reinforced synthetic resin impregnated material windings having a fiber orientation relative to said longitudinal axis selected in accordance with strength requirements of the bumper bar along its length, said substantially rectangular configuration having two shorter and two longer walls with two longer walls of said two bodies bonded together along the entire length of said bumper bar, said two longer walls which are bonded together forming a central double wall extending substantially horizontally in a use position of said bumper bar for an increased bonding strength.

2. The vehicle bumper bar of claim 1, wherein said box-shaped completely closed cross-sectional configuration of both wound bodies together has an approximately square shape.

3. The vehicle bumper bar of claim 1, wherein each of said box configurations has two horizontal walls and two vertical walls, said horizontal walls having a fiber orientation which absorbs impact and tension loads approximately in the horizontal direction whereby the fibers in said horizontal walls extend at about ±45° angles relative to said longitudinal axis.

4. The vehicle bumper bar of claim 3, wherein said vertical walls have a fiber orientation which enclose small angles in the range of 0° to 10° relative to said longitudinal axis.

5. The vehicle bumper bar of claim 1, further comprising towing means (7, 11, 12) operatively integrated into the wound body or bodies.

6. The vehicle bumper bar of claim 5, wherein said box configuration has horizontal walls and vertical walls, said towing means being operatively secured to at least one of said horizontal walls.

7. The vehicle bumper bar of claim 5, wherein said towing means are adhesively bonded to at least one of said two bodies.

8. The vehicle bumper bar of claim 6, wherein said towing means comprise a securing plate which is connected to at least one of said horizontal walls.

9. A fiber-reinforced vehicle bumper bar having a central longitudinal axis, comprising at least two wound bodies of fiber-reinforced synthetic resin impregnated material windings, each of said bodies having a box shaped completely closed cross-sectional configuration, said windings having a fiber orientation relative to said central longitudinal axis selected in accordance with strength requirements of the bumper bar along its length, both bodies having an approximately rectangular cross-section bonded together to form a cross-section of about square shape with two adjacent longer walls of said two bodies extending horizontally in the use position of said bumper bar, and towing means comprising a plate operatively connected between said two adjacent longer horizontal walls of said two bodies for reinforcing said bumper bar.

10. The vehicle bumper bar of claim 9, wherein said securing plate is adhesively bonded to said two adjacent horizontal walls as a result of the curing of the synthetic resin.

11. The vehicle bumper bar of claim 9, wherein said body has a recess (13), said towing means being located in said recess so as not to project beyond an outer contour of said bumper bar.

* * * * *